United States Patent [19]
McFall

[11] Patent Number: 5,098,248
[45] Date of Patent: * Mar. 24, 1992

[54] RECIPROCATING CONVEYOR LOADER

[76] Inventor: Robert M. McFall, P.O. Box 1282, Clintwood, Va. 24228

[ * ] Notice: The portion of the term of this patent subsequent to Jan. 29, 2008 has been disclaimed.

[21] Appl. No.: 627,734

[22] Filed: Dec. 14, 1990

RELATED U.S. APPLICATION DATA

[63] This application is a continuation of 413,996, Sept. 28, 1989 Pat. No. 4,988,253 which is a continuation-in-part of 129,593 Dec. 7, 1987 abandoned.

[51] Int. Cl.[5] ............................................. B65G 67/08
[52] U.S. Cl. .................................... 414/397; 414/398; 198/831; 198/861.2
[58] Field of Search ..................... 414/397, 398, 141.2, 414/142.2, 340, 341, 342, 345; 198/631, 830, 831, 861.2, 364

[56] References Cited

U.S. PATENT DOCUMENTS

| | | | |
|---|---|---|---|
| 769,947 | 9/1904 | Kramer | 198/631 X |
| 1,448,756 | 3/1923 | MacEachen | 414/397 X |
| 1,920,500 | 8/1933 | Garcia et al. | 414/398 X |
| 3,695,415 | 10/1972 | Bakker et al. | 198/547 X |
| 3,701,411 | 10/1972 | McGinnis | 198/825 X |
| 4,119,193 | 10/1978 | Smith et al. | 198/371 |
| 4,377,230 | 3/1983 | Bürkner | 193/14 X |
| 4,852,724 | 8/1989 | Bodimer | 198/861.2 |

FOREIGN PATENT DOCUMENTS

| | | | |
|---|---|---|---|
| 633293 | 7/1936 | Fed. Rep. of Germany | 414/398 |
| 0006842 | 1/1983 | Japan | 414/398 |
| 0765162 | 9/1980 | U.S.S.R. | 414/398 |
| 270008 | 5/1927 | United Kingdom | 414/398 |

*Primary Examiner*—Robert J. Spar
*Assistant Examiner*—William M. Hienz
*Attorney, Agent, or Firm*—Luedeka, Hodges, Neely & Graham

[57] ABSTRACT

A conveyor loader for loading railroad cars or the like with coal or other crushed, ground or particulate material includes a support providing a guideway extending along the line of railroad cars and a line of segmented carriages rollably mounted upon the guideway. An endless belt of elastomeric construction is supported by the line of carriages for movement of an upper run of the belt between the ends of the carriage lines. Motors are associated with each of the line of carriages and the conveyor belt for moving the carriage line and the belt in either of two directions relative to its supporting structure. During a loading operation with the loader, coal or other particulate material is delivered to the upper run of the belt from a central loading station and conveyed to an end of the belt where it is directed into a railroad car to be loaded. By appropriately moving the carriages along the guideway and the belt along the carriages, the upper belt run can be positioned in condition for delivering coal or other material off one of its ends to any of a number of railroad cars in the line.

2 Claims, 6 Drawing Sheets

RECIPROCATING CONVEYOR LOADER

This application is a continuation of application Ser. No. 07/413,996, filed Sep. 28, 1989 and now issued as U.S. Pat. No. 4,988,253 which is a continuation-in-part application of Ser. No. 07/129,593, filed Dec. 7, 1987 and now abandoned. Each of these referenced parent applications is entitled Reciprocating Conveyor Loader.

This invention relates generally to loading devices used primarily for loading crushed coal or the like into railroad cars at a siding, and is more particularly concerned with a device or apparatus for greatly increasing the loading capacity of a limited or fixed length siding operation.

Coal loading operations of a line of railroad cars in mountainous terrain commonly involves the use of a siding, or side tracks, which is shorter in length than s usually desirable since flat land suitable for construction of a track of substantial length is normally not available. Consequently, complete loading of all railroad cars situated on the siding through the use of conventionally centrally-located stationary loading means such as tipples, hoppers, chutes or the like is impractical in many situations where the length of cars to be loaded approximates the length of the siding.

The present invention has as its principal objective, therefore, to provide a loading device or apparatus which, for the same siding length, can load twice the number of cars as is possible with conventional stationary loading hoppers or the like which are typically centrally located on the siding.

The invention resides in an apparatus for loading a laterally-curved, stationary line of railroad cars or the like with coal or other crushed, ground or particulate material delivered from a loading center.

The apparatus is comprised of a support frame positioned adjacent the railroad cars to be loaded and which provides an elongated guideway extending generally along the line of railroad cars and generally corresponding in lateral curvature to the curved shape of the railroad car line as a path is traced from one end of the line to the other end of the line. Carriage means including a line of segmented carriages having two opposite ends are mounted upon the guideway of the support frame for movement longitudinally therealong in either of two longitudinal directions. The segmented carriages are pivotally connected to one another to accommodate the lateral movement of the line of segmented carriages along a curved section of the guideway. The carriages also include wheels positioned in rolling contact with the guideway so that the line of segmented carriages is rollably mounted thereupon. Means are associated with the carriage means for moving the line of segmented carriages in either of two longitudinal directions along the guideway so that the carriage means can be selectively moved in either of two longitudinal directions.

The apparatus also includes an endless conveyor belt movably carried by the line of segmented carriages and which provides an upper run which extends from one end of the line of segmented carriages to the other end of the line of segmented carriages. The belt is supported by the carriage means so that its upper run is positioned above the top of the railroad cars in the railroad car line. Each of the upper run of the belt and the line of segmented carriages has a length which is less than the length of the guideway so that while a portion of the upper run is in position for receiving coal or other particulate material from the loading center, an end of the upper run can be selectively positioned at any of a number of locations along the guideway length for delivery of coal or other particulate material conveyed off the end of the upper run into a car in the railroad car line. The belt is constructed of an elastomeric material which accommodates a lateral flexing of the belt through lateral curvatures in the line of segmented carriages and is trough-like in form so that its upper run provides an expansive trough-like supporting surface for receiving coal or other particulate material deposited therein from the loading center. Means are carried by the carriage means for moving the conveyor belt relative to the line of segmented carriages so that the upper run of the belt bodily moves between the ends of the line of segmented carriages for conveying coal or other particulate material positioned therein to an end of the line of segmented carriages and so that the conveyor belt can be moved in either of two directions relative to and along the line of segmented carriages. The conveyor belt cooperates with the carriage means so that the movement of the belt relative thereto is independent of the movement of the line of segmented carriages along the support frame guideway.

The support frame supports the carriage means and endless conveyor belt in such a relation to the loading center and the line of railroad cars so that while the upper run of the belt is positioned along the support frame guideway for receiving coal or other particulate material from the loading center, an end of the upper run can be positioned by the carriage moving means in a condition for delivering coal or other particulate material which is conveyed off the end of the upper run into a preselected one of the railroad cars in the line. Therefore, by controllably moving the carriage means relative to the guideway while the belt is moved relative to the carriage means, the coal or other particulate material can be conveyed to any of a number of cars in the railroad car line.

Figure 1:
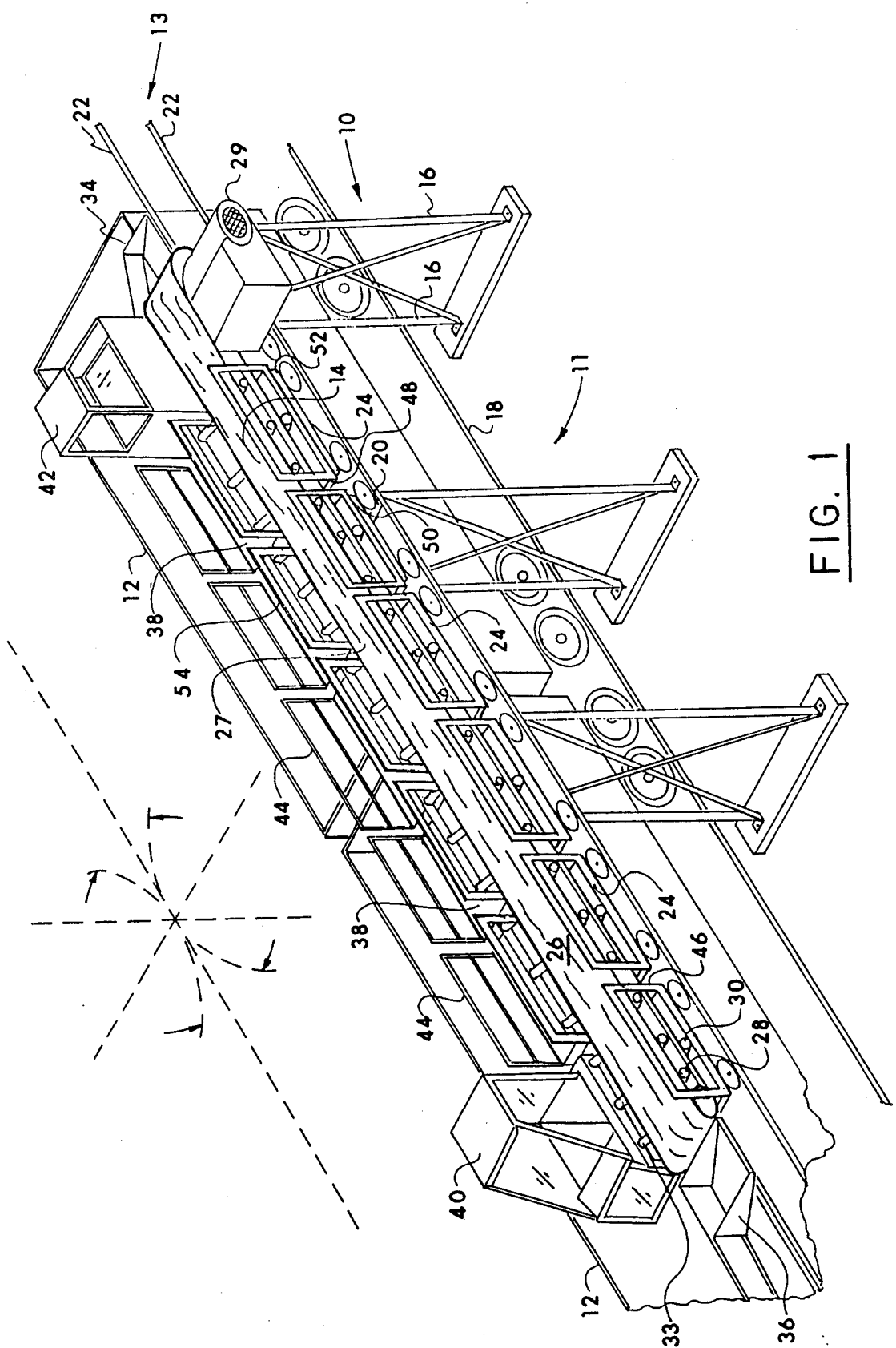
FIG. 1 is a perspective view of a fragment of a reciprocating conveyor loader positioned adjacent a line of railroad cars.
Figure 2:
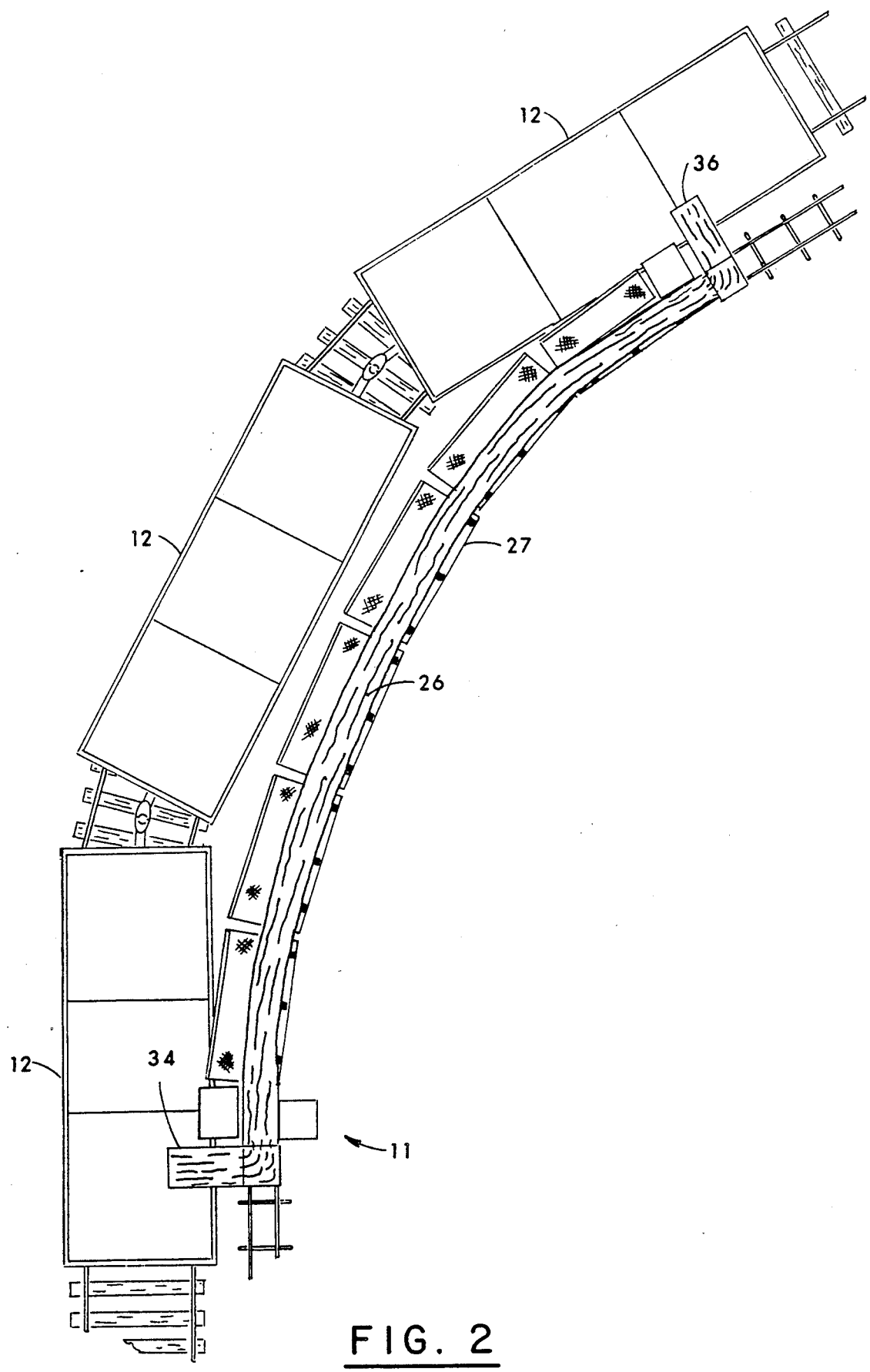
FIG. 2 is a top plan view of the FIG. 1 apparatus when positioned along a curved line of railroad cars.
Figure 5:
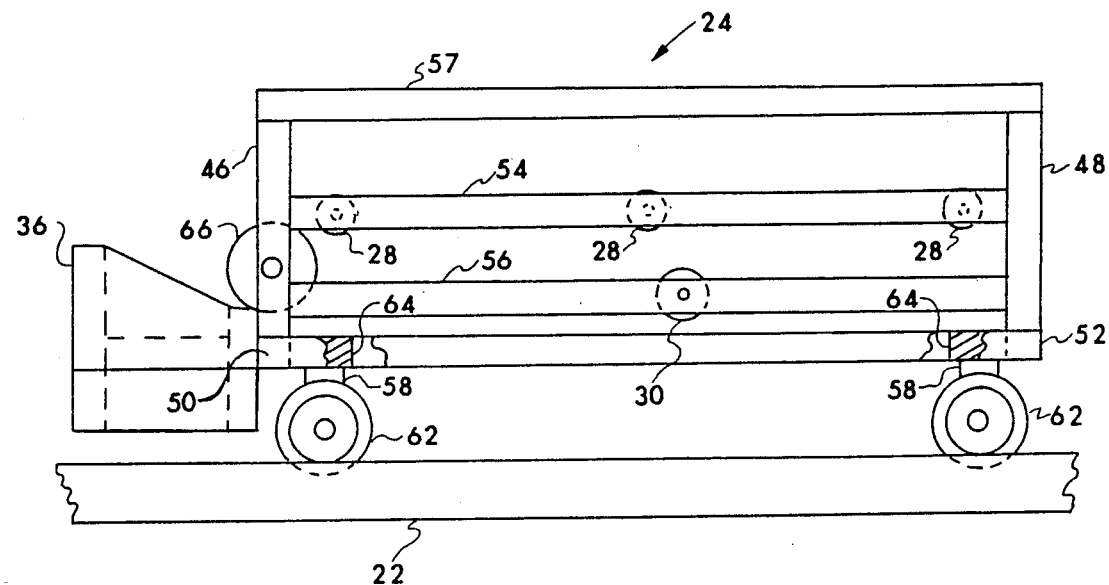
FIG. 5 is a side view of the carriage illustrated in FIG. 4, shown with a chute affixed thereto.

With reference to FIGS. 1 and 2, there is shown a loading apparatus, generally indicated 11, comprising support means in the form of frame 10 positioned adjacent a line of railroad cars 12 situated upon a siding and conveyor means 14 carried by the support means. The frame 10 provides an elongated guideway, generally indicated 13, extending along the line of railroad cars 12, and the conveyor means 14 has a length which is substantially less than the total length of the guideway 13 and is mounted upon the guideway 13 for reciprocal movement therealong.

In the depicted embodiment 11, the support frame 10 includes a plurality of upright support 16 such as steel I-beams or the like which are anchored by any suitable means such as concrete footings into the ground adjacent the track 18 of the railroad siding. Horizontal I-beam cross-pieces are welded to the top of support 16, and the guideway 13 includes railroad or similar type tracks 22 positioned upon the supports 16. The apparatus 11 includes carriage means including a line of segmented carriages 24 mounted upon the guideway of the support frame 10 for movement longitudinally therealong in either of two longitudinal directions. The segmented carriages 24 are pivotally connected to one another to accommodate lateral movement of the line of segmented carriages along a section of the guideway 13 which is curved in accordance of the shape of the railroad car line, as depicted in FIG. 2. The carriages 24 also include wheels positioned in rolling contact with the guideway tracks 22 so that the line of segmented carriages 24 is rollably mounted upon the guideway tracks 22.

For moving the carriages 24 back and forth along the guideway tracks 22, the apparatus 11 includes moving means 33 in the form of a reversible motor connected in driving relationship with the carriage wheels. The actuation, de-actuation, direction and speed of the moving means 33 can be controlled within operator control booths 40 and 42 mounted upon the carriage means adjacent the ends of the carriage line.

Figure 3:
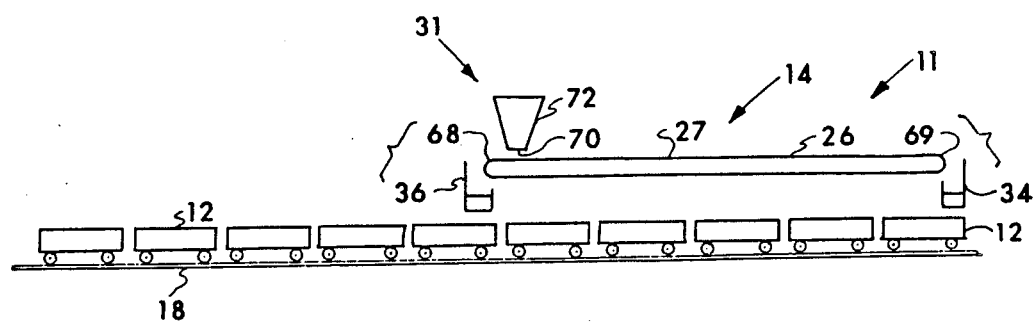
FIG. 3 is a somewhat schematic representation of the FIG. 1 apparatus as seen from a side when the apparatus is in position for loading a preselected railroad car in a line of railroad cars.
Figure 4:
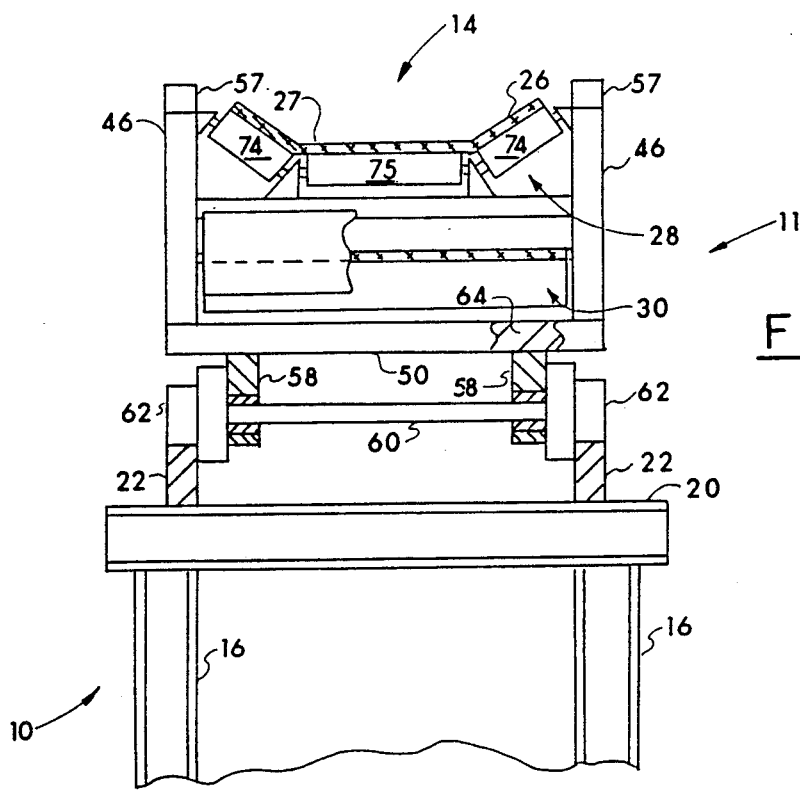
FIG. 4 is an end view, shown partially in section, of the FIG. 1 apparatus.
Figure 7:
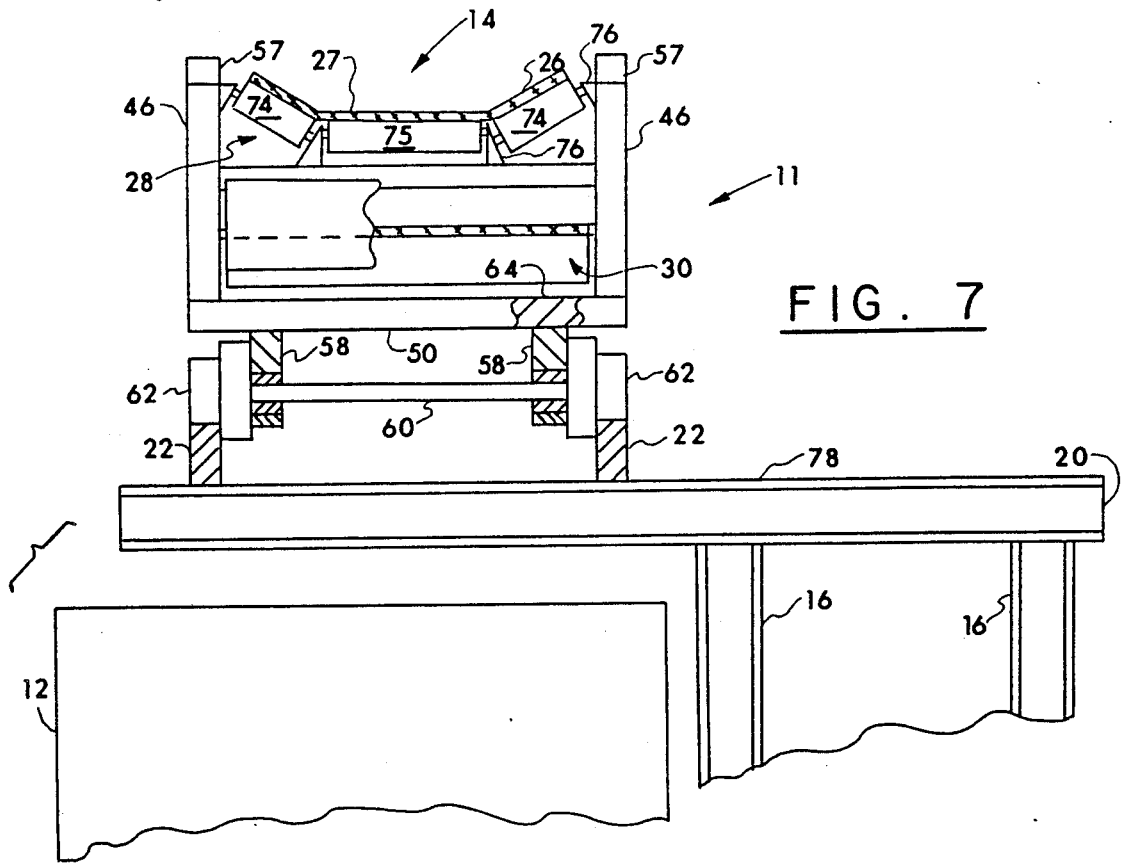
FIG. 7 is an end view of an alternative embodiment of a conveyor loading apparatus illustrating a variation in the support structure and relative positions of the conveyor and cars.
Figure 6:
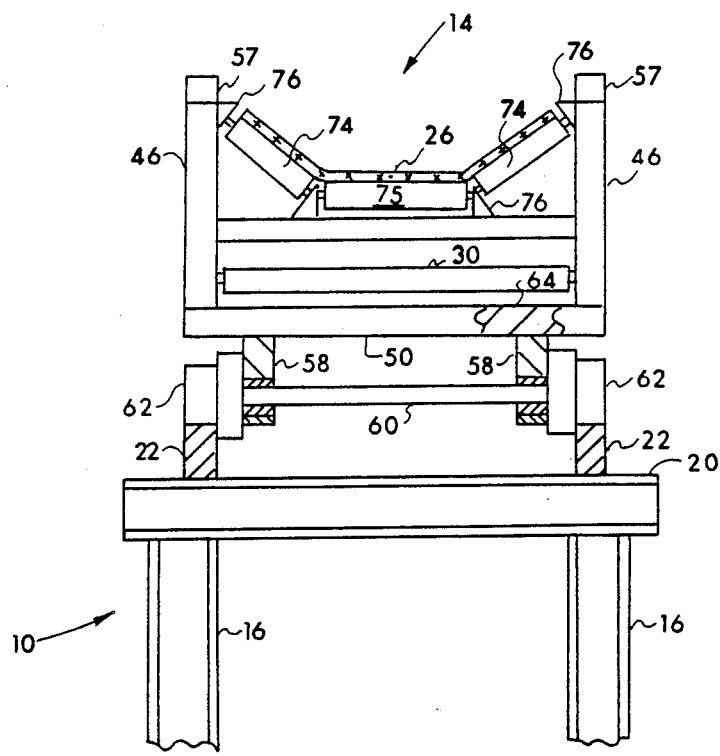
FIG. 6 is a transverse cross-sectional view of the FIG. 1 apparatus.

For supporting the endless belt 26 of the conveyor means 14, the carriages include upper roller means 28 and return roller means generally designated 30. An electric motor driven power means 29, reversible and preferably of variable speed, is mounted upon the carriage means and connected in driving relationship to the belt 26 so that the upper run of the belt, indicated 27, can be moved in either of two longitudinal directions along the length of the segmented carriages 24. This same power means, or a separate one as is well known in the art and which may be electric motor means, may be moved to move the line of carriages 24 in the appropriate direction and at the appropriate time to position the outlet of the chute 34 or 36, which chutes are affixed to the end carriages, over the railroad car being loaded. As indicated above, the efficient use of the present invention is to dimension the conveyor belt length at about one-half the length of the side track so that all of the cars thereon can be loaded from a centrally-located loading means, or station 31 (FIG. 3).

If desired, the carriages 24 may also support an operator catwalk or walkway segments 38. The operator control booths 40 and 42, mentioned earlier, provide operator stations from which an operator can properly position the chutes 34 and 36 and monitor the conveyor belt loading and unloading operations. Safety wall segments 44 may also be provided on the catwalk.

With reference to FIGS. 4–7, the carriages 24 may be constructed of welded angle iron or tubular steel providing end posts 46 and 48, end bases 50 and 52, upper roller supports 54, lower roller supports 56, a rail 57, wheel journals 58, axles 60, and wheels 62. Cross pieces 64 provide the journals 58. An end roller 66 is mounted at the leading ends of the end carriages 24 from which the material carried by the belt 26 is dumped into the chutes. The carriages 24 are pivotally connected by any suitable means, such as a tongue and pintle socket, tongue and ball socket or a like structure known in the art. It should be noted that the construction of the carriage means is exemplary only and is not intended to limit the large variety of equivalent carriage constructions which may be employed to rollably support the conveyor belt 26.

In order that the conveyor belt 26 accommodate lateral flexing required to move the belt 26 along the curvature of the line of segmented carriages 24, the belt 26 is preferably a trough-type of belting including elastomeric material. An example of such a laterally-flexible belting is shown and described in U.S. Pat. No. 4,410,082. In the depicted embodiment 11, the upper run of the belt 26 is supported by slanted rollers 74 and horizontal rollers 75 intended to maintain the trough-like form of the upper run of the belt 26. With the upper run maintained in its trough-like configuration as aforedescribed, the belt 26 can readily conform to any track curvature which may exist in the railroad siding. If necessary, for larger curvature, the lower or return roller means 30 may also comprise a troughing arrangement such as shown for upper roller means 28. Such belting and the roller supports therefor and power drives are conventional so that further description of them is not believed to be necessary.

To use the apparatus 11 and with reference to FIG. 3, the line of carriages 24 is positioned over a first half, or the right half as viewed in FIG. 3, of a line of railroad cars 12 with the end 68 of the belt 26 positioned substantially beneath the discharge port 70 of a coal hopper 72 or equivalent means such as a feed conveyor from a coal crushing and grading operation. The chute 36 positioned at the belt end 68 is positioned over a car stationed just to the left of the midpoint of the car line. The belt moving means 29 (FIG. 1) is actuated to convey the upper run 27 of the belt toward the left, as viewed in FIG. 3, and the carriage moving means is then actuated to slowly move the carriages 24 along the guideway tracks 22 toward the left as viewed in FIG. 3. At the same time, the coal or similar material is dumped from the hopper 72 onto the upper run of the belt 26. The rate at which the coal is dumped onto the belt 26 from the hopper 72 and the belt and carriage speeds are controlled by an operator to effect proper loading of the cars in an efficient and uniform manner.

Once the left end 68, as viewed in FIG. 3, of the belt 26 is moved leftwardly, as viewed in FIG. 3, along the line of railroad cars 12 so that the car 12 in the left half of the railroad car line is filled, the directions of movement of the carriages 24 and the belt 26 are reversed so that each of the upper run of the belt 24 and line of carriages 24 move rightwardly, as viewed in FIG. 3, along the railway car line. With coal continued to be delivered to the upper run from the hopper 72, the railroad cars 12 positioned in the second half, or right half as viewed in FIG. 3, of the railroad car line are filled in sequence as the coal from the hopper 72 is directed off the rightward end 69 of the belt 26 and through the chute 34.

It follows that the depicted embodiment 11 permits a line of railroad cars to be loaded in a prompt and efficient manner. Moreover, the independency of operation between the means 33 for moving the line of carriages 24 along the guideway 13 and the means 29 for moving the upper run 27 of the belt 26 along the line of carriages 24 permits an operator to accurately control the amount of coal delivered to any railroad car in the line or, if desired, skip preselected ones of the cars 12.

It follows that by appropriately controlling the actuation and de-actuation of the means 33 for moving the carriage 24 and the means 29 for moving the belt 26, the railroad cars can be loaded in any random manner. By comparison, the skipping of railroad cars during a loading operation would be difficult using the "drop under the tipple" or the unit train approach.

In another situation, the railroad cars may be desired to be filled with two classes of coal, such as class A and class B friable material. For present purposes, class A material is delivered to the belt 26 during the morning hours while only class B material is delivered to the belt 26 during the evening hours. To fill the cars with both class A and class B material, the cars are filled half-way during the morning hours with class A material and filled in the evening with class B material. It follows that some cars in the line can be filled with a mixture of materials while the others are filled with only one class of material. Of course, as long as more than two classes or qualities of friable material are delivered to the belt 26, the apparatus 11 enables more than two classes or qualities of material to be mixed or sorted throughout the railroad car line.

Figure 8:
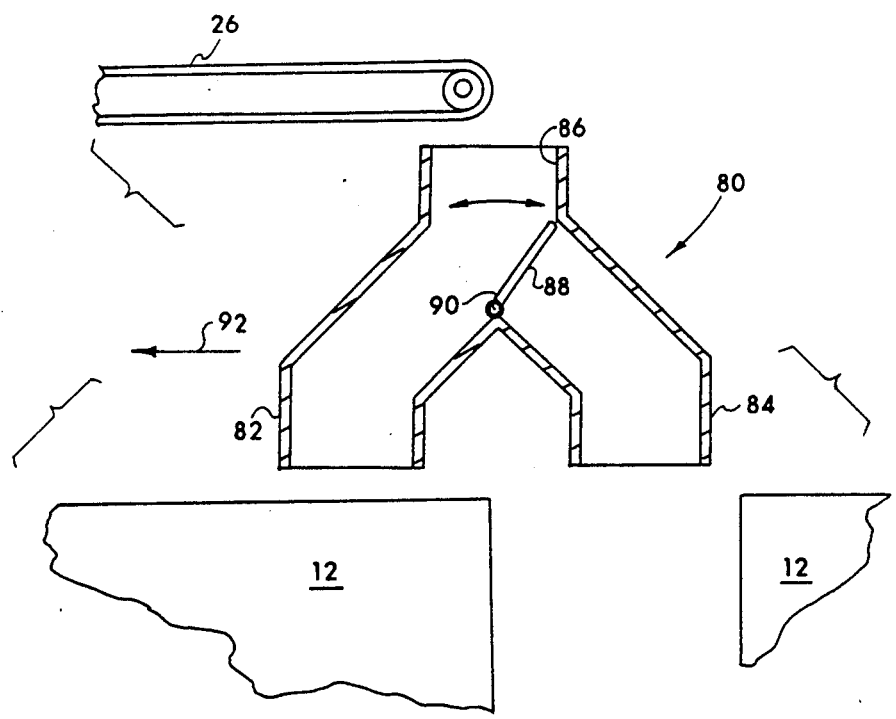
FIG. 8 is a side sectional view of a double secondary transport means for preventing spillage between cars during loading.

With reference to FIG. 8, a double secondary transport means such as a chute 80 having a Y-shaped form may be provided for preventing spillage of material between the cars 12 during loading. The chute 80 includes two outlets 82 and 84 connected to a plenum 86 within which is pivotally mounted a material diverting gate 88. The gate 88 may be manually or automatically operated by rotation of its shaft to selectively open or close the outlets 82 or 84. For example, with the belt 26 and chute 80 moving in the direction of the arrow 92 relative to the cars 12, each outlet 82 or 84 is closed by the diverting gate 88 as it passes across the space provided between the cars 12. For a teaching of such a double chute construction, reference may be had to U.S. Pat. No. 4,284,380.

Figure 9:
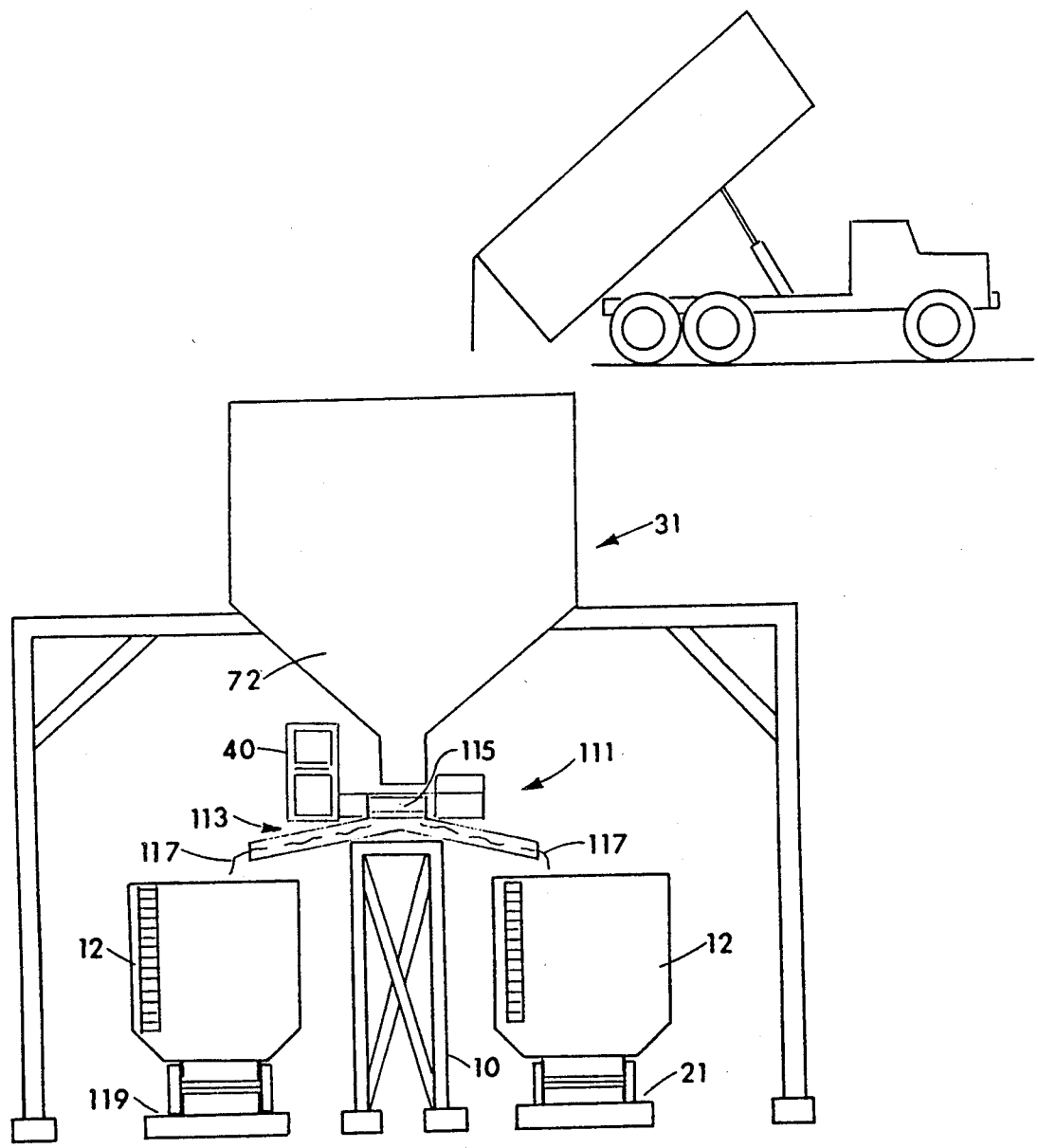
FIG. 9 is a perspective view of an alternative embodiment of a conveyor loading apparatus for loading railroad cars positioned on parallel tracks.

It will be understood that numerous modifications and substitutions can be had to the aforedescribed embodiment without departing from the spirit of the invention. For example, although the aforedescribed embodiment 11 has been shown and described as including chutes 34 and 36 for loading cars in a single line of cars, a chute may be employed for loading cars situated in parallel side tracks. For example and with reference to FIG. 9, there is illustrated an alternative conveyor loader embodiment 111 employing a double chute 113 attached to each end of a line of carriages for gravitationally directing material which falls off an end of the belt 115 simultaneously into two railroad cars 12 positioned upon parallel side tracks 119, 121. Other components of the loader 111 which correspond to the embodiment 11 of FIGS. 1-7 accordingly bear the same reference numerals. Accordingly, the aforedescribed embodiments are intended for the purpose of illustration and not as limitation.

I claim:

1. An apparatus for loading a laterally-curved, stationary line of railroad cars, with coal or other crushed, ground or particulate material delivered to the apparatus from a loading center, said apparatus comprising:

a support frame positioned adjacent the railroad cars to be loaded and providing an elongated guideway extending generally along the line of railroad cars and generally corresponding in lateral curvature to the curved shape of the railroad car line as a path is traced from one end of the car line to the other end of the car line;

carriage means including a line of segmented carriages having two opposite ends and mounted upon the guideway of said support frame for movement longitudinally therealong in either of two longitudinal directions, said segmented carriages being pivotally connected to one another to accommodate the longitudinal movement of the line of segmented carriages along a laterally-curved section of the guideway, said carriage means including wheels positioned in rolling contact with the guideway so that the line of segmented carriages is rollably mounted upon the guideway;

means associated with the carriage means for moving the line of segmented carriages in either of two longitudinal directions along the guideway;

an endless conveyor belt carried by the line of segmented carriages so as to provide an upper belt run which extends from one end of the line of segmented carriages to the other end of the line of segmented carriages, said belt being supported by the carriage means above the top of the railroad cars of the railroad car line, the upper run of the belt and the line of carriages having a length which is less than the length of the guideway so that while a portion of the upper run is positioned in a condition for receiving coal or particulate material from the loading center, an end of the upper belt run can be positioned in a condition for delivering coal or other particulate material conveyed off of an end of the upper run into any of a number of cars in the railroad car line, the belt being constructed of an elastomeric material accommodating a lateral flexing of the belt through lateral curvatures in the line of segmented carriages and being trough-like in form so that its upper run provides an expansive trough-like supporting surface for receiving coal or other particulate material delivered to said apparatus from the loading center;

means for moving the conveyor belt relative to the line of railroad cars so that the upper run of the belt bodily moves between the ends of the line of segmented carriages for conveying coal or other particulate material positioned therein to an end of the upper belt run and so that the conveyor belt can be moved in either of two directions relative to and along the line of segmented carriages, the conveyor belt cooperating with the carriage means so that the movement of the conveyor belt relative to the carriage means is independent of the movement of the line of segmented carriages along the guideway of the support frame; and the support frame supporting the carriage means and conveyor belt in such a relation to the loading center and the line of railroad cars that while the upper run of the belt is positioned by the carriage moving means in a condition for receiving coal or other particulate material from the loading center, an end of the upper run can be positioned by the carriage means in a condition for directing coal or other particulate material which is conveyed off an end of the upper run into a preselected one of the railroad cars in the line.

2. The apparatus as defined in claim 1 wherein the stationary line of railroad cars is a first line of railroad cars and there exists a second line of railroad cars arranged parallel to and beside the first car line, and said apparatus further comprises:

secondary transport means supported by the carriage means at each end of the line of segmented carriages for receiving coal or other particulate material which is conveyed off of an end of the upper run of the belt and directing the coal or particulate material into the top of at least one railroad car in the parallel arrangement of railroad car lines.

* * * * *